(12) United States Patent
Baharav et al.

(10) Patent No.: US 7,155,066 B2
(45) Date of Patent: Dec. 26, 2006

(54) SYSTEM AND METHOD FOR DEMOSAICING RAW DATA IMAGES WITH COMPRESSION CONSIDERATIONS

(75) Inventors: Izhak Baharav, San Jose, CA (US); Ramakrishna Kakarala, Sunnyvale, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 599 days.

(21) Appl. No.: 09/871,408

(22) Filed: May 31, 2001

(65) Prior Publication Data

US 2003/0016877 A1 Jan. 23, 2003

(51) Int. Cl.
*G06K 9/46* (2006.01)
(52) U.S. Cl. ..................... 382/248; 382/275
(58) Field of Classification Search ........ 382/162–167, 382/240, 250, 275, 236, 260, 266, 232–233, 382/248, 261, 268, 269; 358/500–523; 348/273–280, 348/222.1; 375/240.29
See application file for complete search history.

(56) References Cited

U.S. PATENT DOCUMENTS

| | | | |
|---|---|---|---|
| 5,065,229 A | | 11/1991 | Tsai et al. |
| 5,778,106 A * | | 7/1998 | Juenger et al. ............. 382/275 |
| 5,838,818 A | | 11/1998 | Herley |
| 6,044,177 A * | | 3/2000 | Herley ...................... 382/233 |
| 6,392,699 B1 * | | 5/2002 | Acharya .................... 348/273 |
| 6,625,305 B1 * | | 9/2003 | Keren ........................ 382/162 |
| 6,731,794 B1 * | | 5/2004 | Zhang et al. ............... 382/165 |
| 6,809,765 B1 * | | 10/2004 | Tao ............................. 348/273 |
| 6,819,801 B1 * | | 11/2004 | Kakarala et al. ........... 382/240 |
| 7,027,654 B1 * | | 4/2006 | Ameres et al. ............. 382/236 |

FOREIGN PATENT DOCUMENTS

| EP | 1079637 | 2/2001 |
|---|---|---|
| WO | WO 01/26359 | 4/2001 |

OTHER PUBLICATIONS

Keren, Daniel and Osadchy, Margarita "Restoring Subsampled Color Images" Machine Vision and Applications, 1999, vol. 11, No. 4, pp. 197-202.
Wong, Ping Wah et al., "Image Processing Consideration for Digital Photography" Proceedings of IEEE COMPCON '97, San Jose, California, Feb. 23-26, 1997, IEEE Comp. Soc. Press, pp. 280-285.

* cited by examiner

*Primary Examiner*—Ishrat Sherali (57) ABSTRACT

A system and method for processing mosaiced images utilizes a compression-aware demosaicing process that takes into consideration a subsequent compression process. The compression-aware demosaicing process is performed using a compression-considered demosaicing operator that incorporates a color space conversion operator and a frequency-based transformation operator, which are typically associated with the compression process. Consequently, the overall efficiency of the system and method is significantly increased. Furthermore, the compression-aware demosaicing process produces artifacts that complement the artifacts produced by the subsequent compression process such that the artifacts are less visible in the final color images, which increases the quality of the final color images.

27 Claims, 7 Drawing Sheets

SYSTEM AND METHOD FOR DEMOSAICING RAW DATA IMAGES WITH COMPRESSION CONSIDERATIONS

FIELD OF THE INVENTION

The invention relates generally to the field of image processing, and more particularly to a system and method for demosaicing raw data (mosaiced) images.

BACKGROUND OF THE INVENTION

Color digital cameras are becoming ubiquitous in the consumer marketplace, partly due to progressive price reductions. Color digital cameras typically employ a single optical sensor, either a Charge Coupled Device (CCD) sensor or a Complementary Metal Oxide Semiconductor (CMOS) sensor, to digitally capture a scene of interest. Both CCD and CMOS sensors are only sensitive to illumination. Consequently, these sensors cannot discriminate between different colors. In order to achieve color discrimination, a color filtering technique is applied to separate light in terms of base colors, typically red, green and blue.

A common filtering technique utilizes a color-filter array (CFA), which is overlaid on a sensor array, to separate colors of impinging light in a Bayer pattern. The Bayer pattern is a periodic pattern with a period of two different color pixels in each dimension (vertical and horizontal). In the horizontal direction, a single period includes either a green pixel and a red pixel, or a blue pixel and a green pixel. In the vertical direction, a single period includes either a green pixel and a blue pixel, or a red pixel and a green pixel. Therefore, the number of green pixels is twice the number of red or blue pixels. The reason for the disparity in the number of green pixels is because the human eye is not equally sensitive to all three primary colors. Consequently, more green pixels are needed to create a color image of a scene that will be perceived as a "true color" image.

Due to the CFA, the image captured by the sensor is therefore a mosaiced image, also called "raw data" image, where each pixel only holds the value for either red, green or blue. The raw data image can then be demosaiced to create a color image by estimating the actual color value, the combination of red, green and blue, for each pixel of the image. The color value of a pixel is estimated by using color information from surrounding pixels.

There are a number of conventional demosaicing methods to convert a raw data image into a color image. Three main common categories of demosaicing methods include inter-polation-based methods, feature-based methods, and Baye-sian methods. The interpolation-based demosaicing methods use simple interpolation formulas to interpolate the color planes separately. The interpolation-based demosaicing methods include bi-linear methods, band-limited interpolation methods using sinc( ) functions, spline interpolation methods, and the like. The feature-based demosaicing methods examine local features of a given image at the pixel level, and then interpolate the image accordingly. The basic idea of the feature-based methods is to avoid interpolating across edges of features. The Bayesian methods attempt to find the most probable color image, given the data, by assuming some prior knowledge of the image structure.

After the raw data image has been demosaiced, the image is usually processed through a color-conversion operation and tone mapping, which are part of the image pipe-line. The resulting image is then typically stored in the camera using some sort of image compression, such as JPEG or JPEG-like compression schemes, to reduce the size of the image file. Therefore, the digital image that is eventually downloaded from the digital camera by the user is usually a compressed image file.

Since the compression process is performed subsequent to the demosaicing process, some image enhancements achieved as a result of the demosaicing process may be significantly reduced or completely off-set by the compression process. As an example, the demosaicing process may create/predict high frequency components in the signal to produce a sharper image. However, the compression process may eliminate or reduce high frequency components of the input image due to the use of quantizers. Therefore, any advantage gained in the demosaicing process may be negated by the compression process.

In view of the above concern, there is a need for a system and method for efficiently processing digitally captured images such that the demosaicing process complements the subsequent compression process.

SUMMARY OF THE INVENTION

A system and method for processing mosaiced images utilizes a compression-aware demosaicing process that takes into consideration a subsequent compression process. The compression-aware demosaicing process is performed using a compression-considered demosaicing operator that incorporates a color space conversion operator and a frequency-based transformation operator, which are typically associated with the compression process. Consequently, the overall efficiency of the system and method is significantly increased. Furthermore, the compression-aware demosaicing process produces artifacts that complement the artifacts produced by the subsequent compression process such that the artifacts are less visible in the final color images, which increases the quality of the final color images.

A method of processing a mosaiced image in accordance with the present invention includes steps of receiving the mosaiced image, which is a representation of a scene of interest, and processing the mosaiced image using a demosaicing operator on blocks of the mosaiced image to derive a representation of a demosaiced image. The demosaicing operator incorporates a frequency-based transformation operator to take into account a subsequent frequency-based compression process. The demosaicing operator may also incorporate a color space conversion operator. The color space conversion operator may be an operator for converting from the RGB color space to the luminance, red chrominance and blue chrominance ($Yc_r c_b$) color space. The method may also include a step of compressing the representation of the demosaiced image using a frequency-based compression scheme, such as a DCT-based compression scheme or a wavelet-based compression scheme.

The frequency-based transformation operator incorporated in the demosaicing operator may be a DCT-based transformation operator. In another embodiment, the frequency-based transformation operator is a wavelet-based transformation operator. The frequency-based transformation operator, as well as the demosaicing operator, may be matrices.

In one embodiment, the step of processing the mosaiced image is a step of interpolating the mosaiced image using the demosaicing operator, which is derived by defining selected coefficients of transformation-related coefficients as being equal to zero. The selected coefficients may be higher frequency components than remaining coefficients of the transformation-related coefficients. In another embodiment, the step of processing the mosaiced image is a step of interpolating the mosaiced image using the demosaicing operator, which is derived by defining the transformation-related coefficients as having a predefined probability distribution. The predefined probability distribution may be a Normal distribution. In this embodiment, the demosaicing operator may be derived using the Bayesian rule.

The representation of the demosaiced image derived from the step of processing the mosaiced image may include a number of image pixel values of the demosaiced image. In another embodiment, the representation of the demosaiced image includes a number of transformed coefficients of the demosaiced image.

A system for processing a mosaiced image in accordance with the present invention includes a compression-aware demosaicing module and a compression module. The compression-aware demosaicing module is configured to demosaic the mosaiced image to produce a representation of a demosaiced image using a demosaicing operator that incorporates a frequency-based transformation operator. The compression module is configured to compress the representation of the demosaiced image to produce a compressed image file by performing a frequency-based compression process. In an embodiment, the compression-aware demosaicing module and the compression module are embodied in an application specific integrated circuit.

In one embodiment, the demosaicing operator incorporates a color space conversion operator for converting to the $Yc_bc_r$ color space. In another embodiment, the frequency-based transformation operator incorporated in the demosaicing operator is a DCT-based transformation operator, and the frequency-based compression process performed by the compression means is a DCT-based compression process. In another embodiment, the frequency-based transformation operator is a wavelet-based transformation operator, and the frequency-based compression process is a wavelet-based compression process. The frequency-based transformation operator, as well as the demosaicing operator, may be matrices.

The demosaicing operator may be derived by defining transformation-related coefficients that are associated with the frequency-based compression process performed by the compression module. In one embodiment, the demosaicing operator is derived by defining selected coefficients of the transformation-related coefficients as being equal to zero. In another embodiment, the demosaicing operator is derived by defining the transformation-related coefficients as having a predefined probability distribution, which may be a Normal distribution. In this embodiment, the demosaicing operator may be derived using the Bayesian rule.

The representation of the demosaiced image produced by the demosaicing means may include a number of image pixel values of the demosaiced image. In another embodiment, the representation of the demosaiced image includes a number of transformed coefficients of the demosaiced image.

Other aspects and advantages of the present invention will become apparent from the following detailed description, taken in conjunction with the accompanying drawings, illustrated by way of example of the principles of the invention.

DETAILED DESCRIPTION

Figure 1:
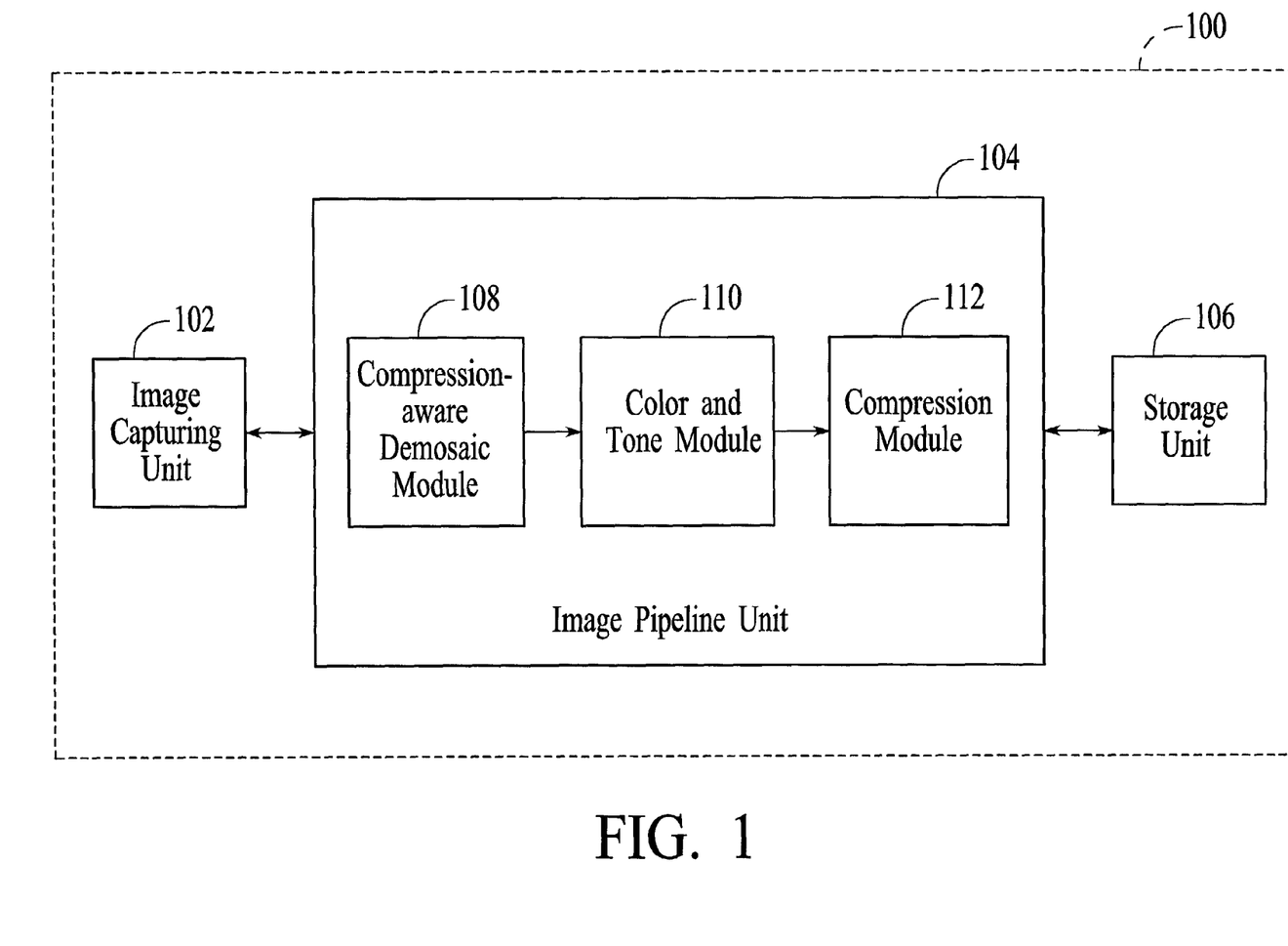
FIG. 1 is a block diagram of an image processing system that performs compression-aware demosaicing process in accordance with the present invention.

With reference to FIG. 1, an image processing system 100 in accordance with the present invention is shown. The image processing system operates to digitally capture a scene of interest as a mosaiced or raw data image. The mosaiced image is then demosaiced and subsequently compressed for storage by the system. The image processing system utilizes a compression-aware demosaicing procedure that takes into consideration the fact that the demosaiced image is subsequently compressed. As a result, the compression-aware demosaicing procedure produces artifacts that complement the artifacts produced by the subsequent compression procedure. Thus, the overall visual distortion caused by the combined artifacts is significantly reduced, which increases the quality of the final digital image. In addition, the compression-aware demosaicing procedure performs steps that are typically performed during a compression process, which increases the efficiency of the image processing system to process the captured image.

The image processing system 100 includes an image capturing unit 102, an image pipeline unit 104, and a storage unit 106. The image capturing unit includes a sensor and a color-filter array (CFA). The sensor may be a Charge Coupled Device (CCD) sensor, a Complementary Metal Oxide Semiconductor (CMOS) sensor, or other type of photo-sensitive sensor. In an exemplary embodiment, the CFA includes red, blue and green filters arranged in a Bayer filter pattern. However, the CFA may include filters of other colors arranged in a different filter pattern. The image capturing unit operates to digitally capture a scene of interest as a mosaiced or raw data image having a color pattern in accordance with the filter pattern of the CFA, e.g., the Bayer pattern.

The image pipeline unit 104 of the image processing system 100 includes a compression-aware demosaic module 108, a color and tone module 110, and a compression module 112. These modules of the image pipeline unit represent functional blocks and are not necessarily separate components. Preferably, the image pipeline unit is an application specific integrated circuit (ASIC).

Figure 2:
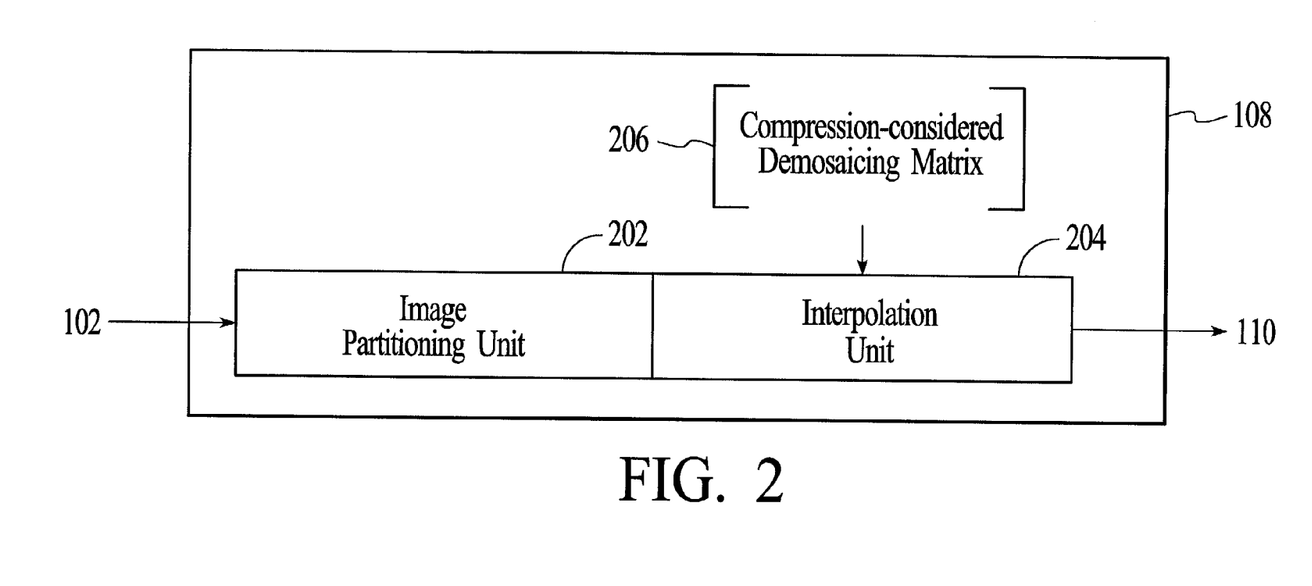
FIG. 2 is a block diagram of a compression-aware demosaic module included in the image processing system of FIG. 1.

The compression-aware demosaic module 102 of the image pipeline unit 104 operates to demosaic a raw data image into a demosaiced or color image. The demosaicing process is performed such that the subsequent compression process performed by the compression module 112 is taken into consideration. The components of the compression-aware demosaicing module are shown in FIG. 2. The compression-aware demosaicing module includes an image partitioning unit 202, an interpolation unit 204, and a compression-considered demosaicing matrix 206. The image partitioning unit operates to partition an input mosaiced image into image blocks, which are equivalent to the blocks that will be operated on by the compression module. As an example, the image partitioning unit may partition the input mosaiced image into 16×16 pixel image blocks. The interpolation unit operates to demosaic each image block of the mosaiced image by multiplying the image block with the compression-considered demosaicing matrix 206 to produce a demosaiced image. Thus, the compression-considered demosaicing matrix 206 is a demosaicing operator that interpolates a mosaiced image into a demosaiced image.

In a first embodiment, the compression-considered demosaicing matrix 206 is derived using a Discrete Cosine Transform (DCT) band-limited approach. Thus, in this embodiment, the interpolation unit can be said to perform a demosaicing process using a DCT band-limited interpolation method. In a second embodiment, the compression-considered demosaicing matrix is derived using a DCT Bayesian approach. In this embodiment, the interpolation unit can be said to perform a demosaicing process using a DCT Bayesian method. As described in detail below, the compression-considered demosaicing matrix incorporates a DCT transformation operator, a sampling operator and a color conversion matrix. The operations associated with these operators are conventionally performed as part of the compression process. Since the compression-considered demosaicing matrix incorporates such operators, some or all of the operations associated with these operators need not be performed during the subsequent compression process.

The compression-considered demosaicing matrix 206 may be stored in a read-only memory (not shown) associated with the image pipeline unit 104. Alternatively, the compression-considered demosaicing matrix may be stored in the storage unit 106.

The color and tone module 110 of the image pipeline unit operates to perform color and tone enhancements to a demosaiced image from the compression-aware demosaic module 108. These enhancements are conventional operations and thus, are not described herein. The color and tone module may perform other conventional image operations such as flare-correction and intermediate color conversion. The color and tone module is optional and may be deleted from the image pipeline unit 104.

The compression module 112 of the image pipeline unit 104 operates to compress the demosaiced image to a compressed image file using a DCT-based compression scheme, such as the JPEG compression scheme. The compression module is described herein as using the JPEG compression scheme. For reference, a conventional JPEG compression scheme is briefly described.

For an input RGB image (e.g., a demosaiced image), each pixel of the RGB image is transformed into the luminance, red chrominance and blue chrominance ($Yc_rc_b$) color space. The space components of the $Yc_bc_r$ color space are then sampled, for example, at 4:1:1. The Y space component is not altered. However, the $c_b$ and $c_r$ space components are sampled by a factor of two in each axis. Thus, the number of $c_b$ and $c_r$ samples is reduced by a factor of four. This is in line with the human visual perception which is less sensitive to sharp variations in color information.

Next, each of the $Yc_bc_r$ color planes is partitioned into disjoint blocks of 8×8. Each of these blocks is then processed in the following manner. The 8×8 block of scalars is transformed using the DCT into a set of 64 coefficients, which can be arranged as an 8×8 array. The set of 64 DCT coefficients is then quantized using a uniform quantizer, which utilizes different quantization step sizes. In general, the higher frequency coefficients are quantized using larger quantization step size. Quantization is a non-linear, non-invertible operation. The quantized coefficients are then coded using a known coding technique, such as Huffman tables or arithmetic coding. Lastly, the coded data is wrapped in a standard file format.

An important feature of the JPEG compression procedure is that the compression scheme assumes that the DCT coefficients that are quantized to a value of greater than zero are concentrated in the low frequencies. Another important feature is that the Y component space has twice the bandwidth of the $c_b$ and $c_r$ component spaces. Furthermore, all the operations of the procedure are performed on blocks of the image. The operations are performed on 16×16 blocks of the original image, and 8×8 blocks in the transformed/sub-sampled domain.

Note that the partitioning of the image into blocks can be done before the color-conversion and sub-sampling, as these steps are point-wise operations that do not interact across block boundaries.

Figure 3:
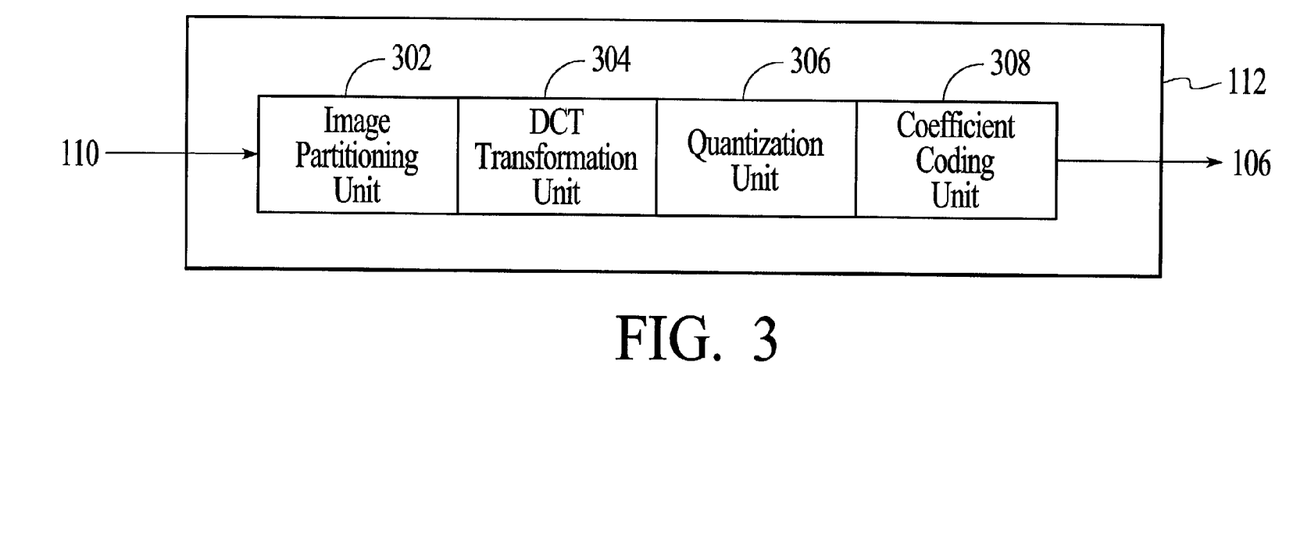
FIG. 3 is a block diagram of a compression module included in the image processing system of FIG. 1.

Turning to FIG. 3, the compression module 112 of the image pipeline unit 104 includes an image partitioning unit 302, a DCT transformation unit 304, a quantization unit 306, and a coefficient coding unit 308. The image partitioning unit performs the image partitioning operation of the JPEG compression scheme. As an example, the image is partitioned into 8×8 blocks of scalars. The DCT transformation unit performs the DCT transformation of the compression scheme. The quantization unit performs the quantization operation of the compression scheme. Lastly, the coefficient coding unit performs the coding operation of the compression scheme. Thus, the compression module does not perform the color conversion and sub-sampling operations of the JPEG compression scheme, which have been included in the demosaicing process performed by the compression-aware demosaic module 108.

The compressed image file produced by the compression module 112 is then stored in the storage unit 106 of the image processing system 100. The storage unit may be a conventional storage memory, such as DRAM or flash memory. Alternatively, the storage unit may be a drive that interfaces with a removable storage medium, such as a standard computer floppy disk.

The image capturing unit 102, the image pipeline unit 104, and the storage unit 106 of the system 100 may be included in a single device, such as a digital camera. Alternatively, the image capturing unit may be included in a separate device. In this alternative embodiment, the functions of the image pipeline unit 104 and the storage unit 106 may be performed by a computer.

The derivation of the compression-considered demosaicing matrix 206 is now described. In accordance with the first embodiment, the compression-aware demosaic module 108 of the image pipeline unit 104 performs a DCT band-limited interpolation using the compression-considered demosaicing matrix to demosaic raw data images. For this embodiment, the compression-considered demosaicing matrix is derived by taking into consideration the band-limiting effect of the subsequent DCT-based compression process performed by the compression module 112.

The DCT band-limited interpolation method essentially solves the problem of how to effectively interpolate a signal from its samples, when the signal is known to be band-limited in the DCT domain. The problem and its solution are described herein mathematically. To make the explanation more lucid, the description deals with one-dimensional signals. Extensions to the two-dimensional case with three color components will be described further below.

Let $\vec{x} \in \mathcal{R}^N$ be a signal described as a column vector:

$$\vec{x} = x(n), n=1, \ldots, N. \quad (1)$$

This signal is sampled by taking every other element to get $$\vec{y} \in \mathcal{R}^{\frac{N}{2}}:$$

$$\vec{y} = \{y(n)\} = \{x(2n-1)\}, n = 1, \ldots, \frac{N}{2}, \quad (2)$$

which can be written as $$\vec{y} = [S]\vec{x}, \quad (3)$$

where [S] is an $$\frac{N}{2} \times N$$

sampling matrix. The matrix [S] is defined as $$[S] = S(i, j) = \begin{cases} 1 & \text{For } j = 2i-1, i = 1, \ldots, \frac{N}{2} \\ 0 & \text{Otherwise} \end{cases} \quad (4)$$

Note that an extension to non-uniform sampling is straight forward.

Let the N×N DCT transformation matrix [T], where each row is a basis function, be defined as:

$$[T] = T(k, l) = \begin{cases} \frac{1}{\sqrt{N}}, & k = 0, 0 \leq l \leq N-1 \\ \sqrt{\frac{2}{N}} \cos\frac{\pi(2l+1)k}{2N}, & 1 \leq k \leq N-1, 0 \leq l \leq N-1 \end{cases} \quad (5)$$

The transformation matrix [T] is a frequency-based transformation operator. Note that [T] is unitary and real. Namely, $$[T][T]^t = [T]^t[T] = [I], \quad (6)$$

where [I] is the identity matrix and the superscript "t" denotes the transpose of a matrix. Thus, the forward and backward DCT of the vector x can be written as Forward transform (Analysis): $\vec{x}_c = [T]\vec{x}$, $\quad (7)$ Backward transform (Synthesis): $\vec{x}_c = [T]^t \vec{x}_c$. $\quad (8)$ Note that $\vec{x}_c$, the DCT coefficients vector, is the same length (N) as the original signal.

Let a signal $\vec{q}$ be defined to be band-limited and denoted as $$\vec{q} \in B_{k_0} \text{ iff } \{q(k)=0 \text{ for } k > k_0\} \quad (9)$$

Using this notation, $\vec{x}$ will now be defined to be DCT band-limited, and denoted as $$\vec{x} \in D_{k_0} \text{ iff } \{\vec{x}_c = [T]\vec{x}, \vec{x}_c \in B_{k_0}\}. \quad (10)$$

The band-limitedness of the DCT coefficients is assumed on the DCT of the image when in $Yc_bc_r$ color space. Thus, a 3×3 transformation matrix from RGB values to $Yc_bc_r$ values is needed. Assuming the RGB space is well defined, the transformation matrix can be readily defined. In general, the transformation matrix will depend on the RGB domain of the image. Where RGB values are assumed to be in the range [0,1], a sample transformation is:

$$\begin{bmatrix} Y \\ c_b \\ c_r \end{bmatrix} = \begin{bmatrix} 65.481 & 128.553 & 24.966 \\ -37.797 & -74.203 & 112 \\ 112 & -93.786 & -18.214 \end{bmatrix} \begin{bmatrix} R \\ G \\ B \end{bmatrix} + \begin{bmatrix} 16 \\ 128 \\ 128 \end{bmatrix} \quad (11)$$

The offset of the transformation is ignored, and the color transformation matrix from RGB to $Yc_bc_r$ will be denoted as $[C_{r2y}]$. The inverse transformation will be denoted as $[C_{y2r}]$. These color transformation matrices are color space conversion operators that can transform signals between an RGB color space and a $Yc_bc_r$ color space.

The reconstruction problem to be solved can now be defined as follows:

Given $\vec{y}$, find $\vec{x}$ such that $([C_{r2y}]\vec{x}) \in D_{k_0}$, and $$\vec{y} = [S]\vec{x}. \quad (12)$$

Note that since the original signal, $\vec{x}$, is a discrete signal, the problem is much simpler than in the continuous case. However, this formulation is not yet simple enough, since the problem deals with a constrained solution. Namely, the desired formulation is one that has a solution of a linear set of equations, where the solution is constrained to a subspace.

The problem defined in expression (12) can be written in the following equivalence:

$$([C_{r2y}]\vec{x}) \in D_{k_0} \text{ iff } \vec{x} = [C_{y2r}][T]^t \vec{a}, \text{ and } \vec{a} \in B_{k_0}. \quad (13)$$

This enables the constrained problem defined in expression (12) to be replaced with the following unconstrained problem:

Given $\vec{y}$, find $\vec{a} \in B_{k_0}$, such that $\vec{y} = [S][C_{y2r}][T]^t \vec{a}$. $\quad (14)$ The compression-considered demosaicing matrix 206 is thus given by:

$$[[S][C_{y2r}][T]^t]^{-1}, \quad (15)$$

which is the inverse of the matrix $[S][C_{y2r}][T]^t$ from the equation in the problem (14). As used herein, the expression "inverse of a matrix" is either a direct inverse or pseudo-inverse of the matrix. Thus, the expression "inverting a matrix" refers to deriving the inverse of the matrix by either direct inverse or pseudo-inverse.

The unconstrained problem (14) has substituted the problem of finding $\vec{x} \in D_{k_0}$ with the problem of finding a set of coefficients. Depending on the values of $k_0$ relative to the number of samples, which is N/2 in the current example, the above problem is either under-determined ($k_0$>N/2), over-determined ($k_0$<N/2), or has the same number of unknowns and equations ($k_0$=N/2). According to this classification, the problem can be solved using minimum-norm solution, least-squares solution, or exact inversion.

For two-dimensional signals, there are a number of implementation issues. First, in order to enable a simpler linear-algebra formulation, the column-ordering of the image can be considered. The column order of a matrix can be obtained by concatenating the columns of the matrix to form a vector. Thus, each color-plane can be ordered as one column vector. Second, since the DCT is a separable transform, the DCT can be applied first to rows and then to columns, or vice versa. Moreover, using the Kronecker product, the transformation matrix on a column-order version of the matrix can easily be defined. The last implementation issue involves the frequency of the input signal. A one-dimensional signal has only one-linear axis of frequency and the frequency is a scalar. Thus, the issue of frequency for a one-dimensional signal is straightforward. However, for two-dimensional signals, the issue of frequency is more complex, which is now described.

Assuming a matrix [A] represents the DCT coefficients of a two-dimensional signal (e.g., one of the image color planes), the band-limitedness to $k_0$ can be any of the following:

$$L^1 \text{ norm}: A(k,l)=0 \text{ for } |k|+|l|>k_0. \tag{16}$$

$$L^2 \text{ norm}: A(k,l)=0 \text{ for } \sqrt{k^2+l^2}>k_0. \tag{17}$$

$$L^\infty \text{ norm}: A(k,l)=0 \text{ for } \max(k,l)>k_0. \tag{18}$$

Figure 4:
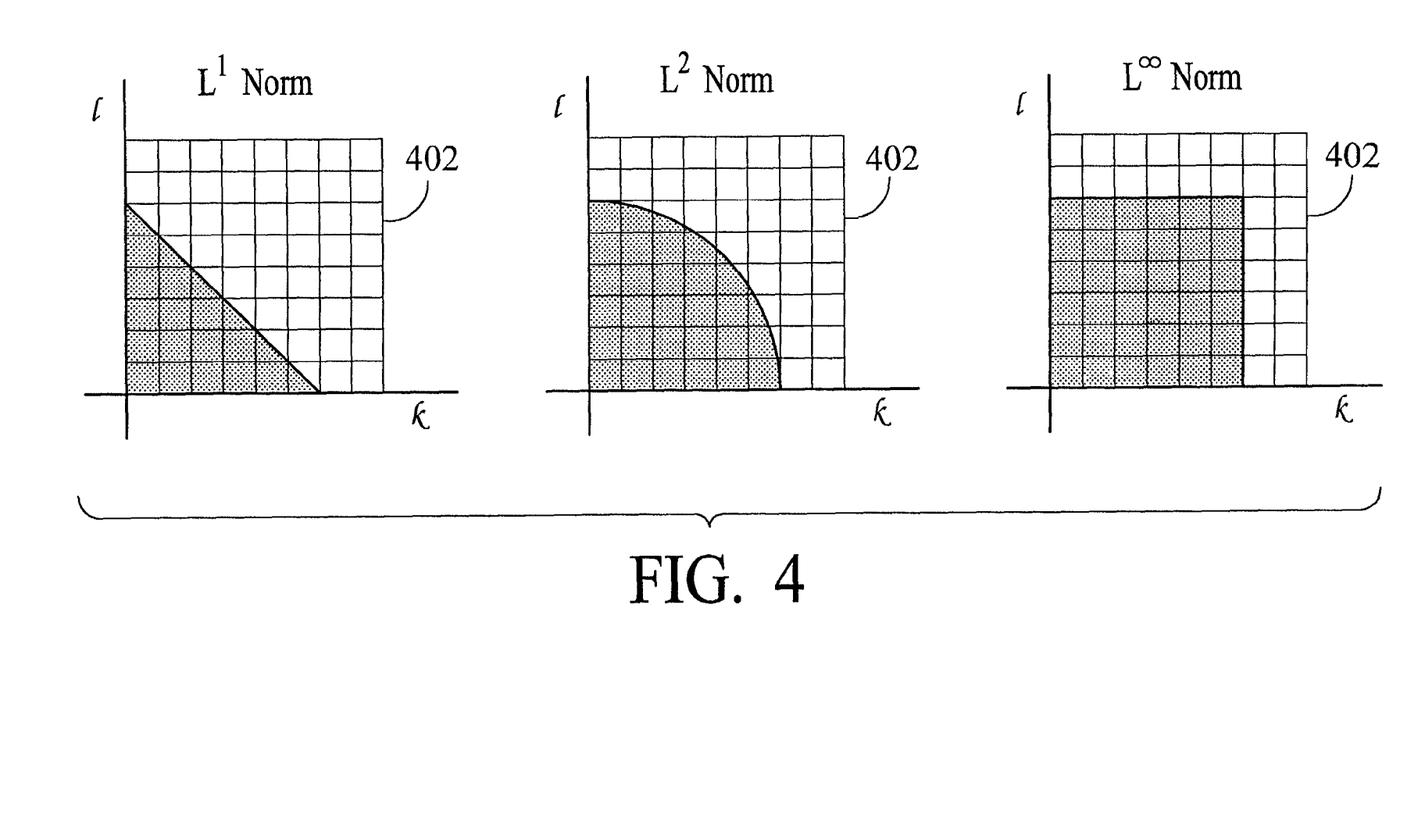
FIG. 4 illustrates various norms that can be used to generate the compression-considered demosaicing matrix for a DCT band-limited interpolation method in accordance with a first embodiment of the invention.

The expressions (16), (17), and (18) are illustrated in FIG. 4, where DCT coefficients of a two-dimensional signal are presented as a two-dimensional set of scalars. The DCT coefficients are shown in FIG. 4 as cells in an 8×8 grid 402, where each cell corresponds to one coefficient. The non-shaded cells correspond to the DCT coefficients that have been assumed to be zero. The remaining DCT coefficients are shown as shaded cells. As illustrated by FIG. 4, the band-limitedness depends on the norm used. The cells that are intersected by the boundary between the shaded region and the non-shaded region should be decided as either shaded or non-shaded cells. Alternatively, these intersected cells can be decided using strict inequality for the range. For the Y component, the $L^1$ norm is found to be more appropriate, due the manner in which the Y component is sampled and the fact that the G component of RGB color space corresponds best to the Y component of $Yc_rc_b$ color space.

Figure 5:
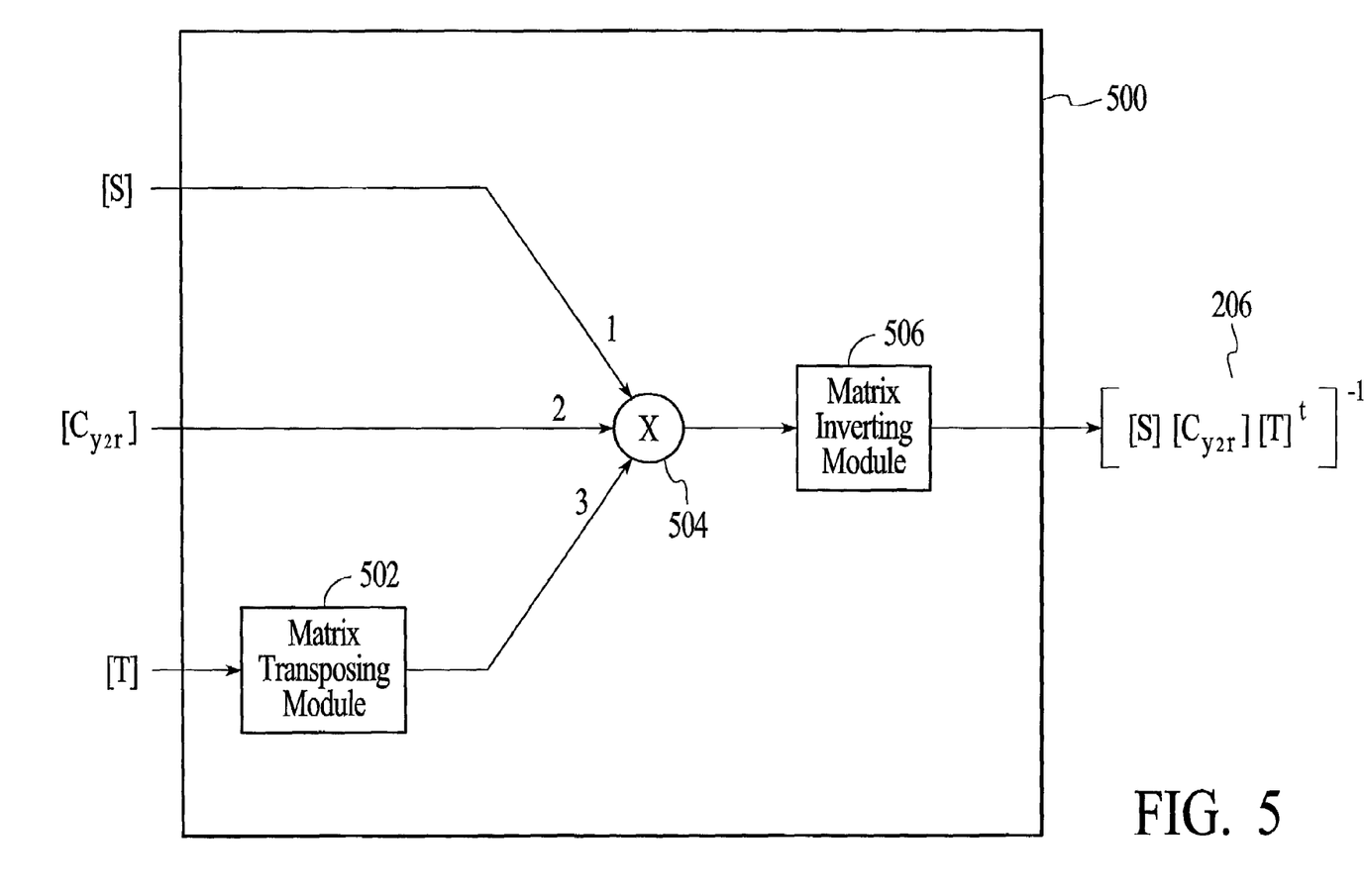
FIG. 5 is a block diagram of a matrix generating system that can be used to generate the compression-considered demosaicing matrix in accordance with the first embodiment of the invention.

The compression-considered demosaicing matrix 206 is generated by a separate system and then programmed into the image processing system 100. In FIG. 5, a matrix generating system 500 in accordance with the first embodiment is shown. The matrix generation system is configured to generate the compression-considered demosaicing matrix, as defined by expression (15). The system of FIG. 5 includes a matrix transposing module 502, a multiplication module 504 and a matrix inverting modules 506. Although the modules 502–506 may be implemented in any combination of hardware, firmware and software, these modules are preferably embodied in the matrix generating system as a software program that performs the functions of the modules 502–506 when executed by a processor (not shown).

In operation, the matrix transposing module 502 of the matrix generation system 500 receives an input matrix [T], which is the DCT transformation matrix. The matrix transposing module then transposes the received matrix [T] to output a matrix $[t]^t$, which is transmitted to the multiplication module 504. The multiplication module 504 receives input matrices [S] and the $[C_{r2y}]$ and the output matrix $[T]^t$ from the matrix transposing module 502. The input matrix [S] is the sampling matrix. The input matrix $[C_{r2y}]$ is the color transformation matrix. The multiplication module then multiplies the three received matrices in the order illustrated in FIG. 5 to derive a matrix [S] $[C_{y2r}]$[T], which is transmitted to the matrix inverting module 506. The module 506 then inverts the matrix [S][$C_{y2r}$][T] to generate the compression-considered demosaicing matrix 206, as defined by expression (15).

In accordance with the second embodiment, the compression-aware demosaic module 108 of the image pipeline unit 104 performs a DCT Bayesian demosaicing process using the compression-considered demosaicing matrix 206 to demosaic raw data images. For this embodiment, the compression-considered demosaicing matrix is derived by assuming some a priori knowledge about the probability distribution of the DCT coefficients.

The DCT Bayesian approach method associates a probability distribution function with each DCT coefficient. Furthermore, the DCT Bayesian approach method assumes that the coefficients are jointly Normal, with mean vector $\vec{\mu}_c$ and covariance matrix $[R_c]$, or expressed mathematically:

$$\vec{z}_c \triangleq ([T][C_{r2y}]\vec{x}) \sim N(\vec{\mu}_c, [R_c]). \tag{19}$$

The Bayesian approach is based on the Bayesian rule for probabilistic distributions. The Bayesian rule is expressed as:

$$Pr(\vec{y}/\vec{x}) = \frac{Pr(\vec{y}/\vec{x})Pr(\vec{x})}{Pr(\vec{y})}. \tag{20}$$

The following notations for general Normal distributions are used herein:

$$\text{Mean}: \vec{\mu}_c \triangleq E(\vec{z}_c) \tag{21}$$

$$\text{Covariance}: [R_c] \triangleq E(\vec{z}_c - \vec{\mu}_c)(\vec{z}_c - \vec{\mu}_c)^t \tag{22}$$

$$\text{Normal distribution}: Pr(\vec{z}_c) \triangleq Pr(z_c(1), z_c(2), \ldots, z_c(N)) \tag{23}$$

$$= \frac{1}{\sqrt{(2\pi)^N |[R_c]|}} \exp\left\{\frac{-1}{2}(\vec{z}_c - \vec{\mu}_c)^t [R_c]^{-1} (\vec{z}_c - \vec{\mu}_c)\right\}. \tag{24}$$

The DCT Bayesian approach uses an additive noise model to formulate the reconstruction problem. The additive noise model is expressed as:

$$\vec{y} = [S]\vec{x} + \vec{n}, \quad (25)$$

where n has a Normal distribution with covariance matrix $[R_n]$, $$\vec{n} \sim N(\vec{0}, [R_n]). \quad (26)$$

The above additive noise model is appropriate since it is natural to assume the measurements are noisy.

Using the above assumptions, the problem of reconstruction can now be formulated as follows:

Given $\vec{y}$, such that $\vec{y} = [S]\vec{x} + \vec{n}$, where $\vec{n} \sim N(\vec{0}, [R_n])$, (27)

find $\vec{x}$, assuming $\vec{z}_c = ([T][C_{r2y}]\vec{x}) \sim N(\vec{\mu}_c, [R_c])$.

The problem (26) is solved using the Bayesian Rule (19). Since the sampled data y is assumed to be given, $\vec{x}$ is chosen such that:

$$\vec{x} = \underset{\vec{x}}{\mathrm{argmax}}\{Pr(\vec{y}/\vec{x})Pr(\vec{x})\}. \quad (28)$$

The assumption about the Gaussian model for noise is incorporated with the Gaussian model for the coefficients. With respect to noise, according to expression (27), $$Pr(\vec{y}/\vec{x}) = Pr(\vec{n} = \vec{y} - [S]\vec{x}). \quad (29)$$

Using expressions (23) and (25), equation (28) can be written as:

$$\log(Pr(\vec{y}/\vec{x})) = c - (\vec{y} - [S]\vec{x})^t [R_n]^{-1} (\vec{y} - [S]\vec{x}), \quad (30)$$

where c is a constant, independent of $\vec{x}$. The ½ factor is dropped, since this factor is eventually cancelled. With respect to the coefficients, the assumption is that the coefficients in the transformed domain have a known Normal distribution. In addition, a linear transformation of a Normal vector is Normal. Thus, the probability of the original discrete signal $\vec{x}$ can be written as:

$$Pr(\vec{x}) = Pr([C_{y2r}][T]^t \vec{z}_c) \quad (31)$$

$$\sim N([C_{y2r}][T]^t \vec{\mu}_c, [C_{y2r}][T]^t [R_c][T][C_{y2r}]^t) \quad (32)$$

$$\triangleq N(\mu_x, [R_x]). \quad (33)$$

The above probability can then be written in the following log form:

$$\log(Pr(\vec{x})) = c - (\vec{x} - \vec{\mu}_x)^t [R_x]^{-1} (\vec{x} - \vec{\mu}_x). \quad (34)$$

Inserting equations (29) and (33) into equation (27), the following equation is derived:

$$\log(Pr(\vec{y}/\vec{x})Pr(\vec{x})) \quad (35)$$

$$= c - (\vec{y} - [S]\vec{x})^t [R_n]^{-1} (\vec{y} - [S]\vec{x}) - (\vec{x} - \vec{\mu}_x)^t [R_x]^{-1} (\vec{x} - \vec{\mu}_x). \quad (36)$$

The covariance matrices are positive and symmetric. Therefore, the same holds true for $[R_n]^{-1}$, $[R_x]^{-1}$, and $[S]^t[R_n]^{-1}[S]$. Consequently, expression (34) can be written as:

$$= c' + 2\vec{x}^t [S]^t [R_n]^{-1} \vec{y} + 2\vec{x}^t [R_x]^{-1} \vec{\mu}_x - \vec{x}^t ([R_x]^{-1} + [S]^t [R_n]^{-1}[S])\vec{x} \quad (37)$$

$$= c' + 2\vec{x}^t ([S]^t [R_n]^{-1} \vec{y} + [R_x]^{-1} \vec{\mu}_x) - \vec{x}^t ([R_x]^{-1} + [S]^t [R_n]^{-1}[S])\vec{x} \quad (38)$$

$$\triangleq c' + \vec{x}^t \vec{p} - \vec{x}^t [Q]\vec{x}, \quad (39)$$

where $$\vec{p} \triangleq 2([S]^t [R_n]^{-1} \vec{y} + [R_x]^{-1} \vec{\mu}_x) \quad (40)$$

and $$[Q] \triangleq ([R_x]^{-1} + [S]^t [R_n]^{-1} [S]). \quad (41)$$

Below are two derivative rules for vectors:

$$\frac{\partial}{\partial \vec{x}}(\vec{x}^t [A]\vec{x}) = [A]\vec{x} + [A]^t \vec{x} \quad (42)$$

and $$\frac{\partial}{\partial \vec{x}}(\vec{x}^t \vec{a}) = \vec{a}. \quad (43)$$

Applying these rules (41) and (42) to expression (38), the following equation is derived:

$$\frac{\partial}{\partial \vec{x}} \log(Pr(\vec{y}/\vec{x})Pr(\vec{x})) = \vec{p} - [Q]\vec{x} - [Q]^t \vec{x}. \quad (44)$$

Equating to zero and solving for $\vec{x}$, $$\vec{x} = ([Q]+[Q]^t)^{-1} \vec{p}. \quad (45)$$

Note that this is the maximum point because [Q] is positive and therefore, the Hessian is negative. Since $[Q]=[Q]^t$, equation (44) can be written as:

$$\vec{x} = \frac{1}{2}[Q]^{-1} \vec{p}.$$

The above equation can be expanded to yield the following simpler form for computation:

$$\vec{x} = [Q]^{-1} [S]^t [R_n]^{-1} \vec{y} + [Q]^{-1} [R_x]^{-1} \vec{\mu}_x. \quad (47)$$

The compression-considered demosaicing matrix 206 is thus given by:

$$[Q]^{-1} [S]^t [R_n]^{-1}. \quad (48)$$

The term $[Q]^{-1}[R_x]^{-1}\vec{\mu}_x$ of equation (46) represents bias. Assuming known noise and known distribution of the coefficients, equation (46) gives a closed form solution to find the most probable $\vec{x}$, given the measurements $\vec{y}$.

The level of noise can be assumed as needed. If the noise is assumed to be very low, the resulting image at the sampling points is essentially forced to be exactly equal to the sample values. However, if the noise is assumed to be high, the values at the sampling points are regarded merely as recommended values to the algorithm. Note that noise can be estimated for the specific type and arrangement of components included in the system. The distribution of the coefficients may be estimated using DCT models or by computing statistics from a by number of sample images.

The bias term $[Q]^{-1}[R_x]^{-1}\vec{\mu}_x$ in equation (48) can be determined off-line. In practice, this bias term can be added after image blocks have been multiplied by the compression-considered demosaicing matrix 206 by the interpolation unit 204 of the compression-aware demosaic module 108.

Figure 6:
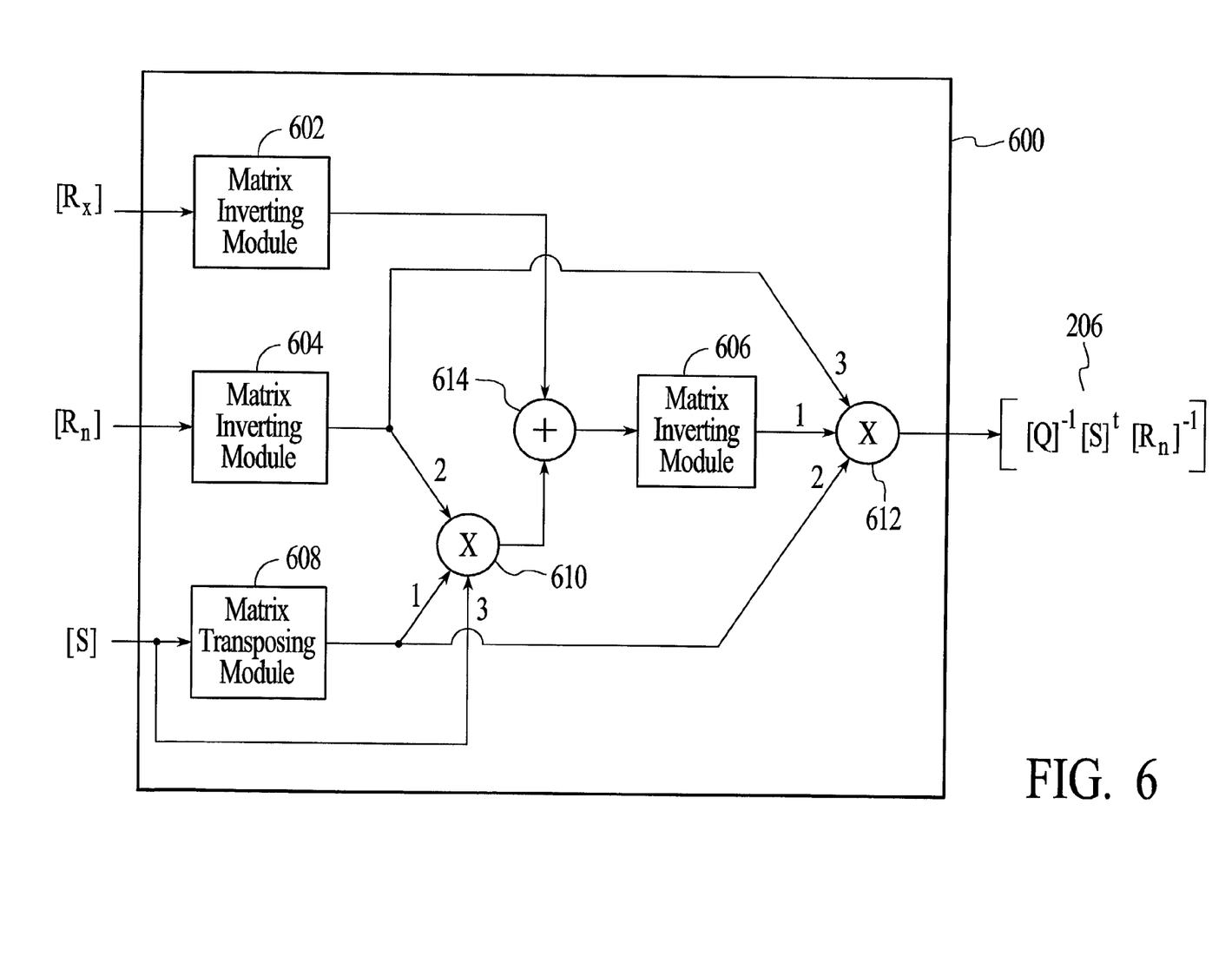
FIG. 6 is a block diagram of a matrix generating system that can be used to generate the compression-considered demosaicing matrix in accordance with a second embodiment of the invention.

In FIG. 6, a matrix generating system 600 in accordance with the second embodiment is shown. The matrix generation system is configured to generate the compression-considered demosaicing matrix 206, as defined by expression (48). The system of FIG. 6 includes matrix inverting modules 602, 604 and 606, a matrix transposing module 608, multiplication modules 610 and 612, and a summing module 614. Although the modules 602–614 may be implemented in any combination of hardware, firmware and software, these modules are preferably embodied in the matrix generating system as a software program that performs the functions of the modules 602–614 when executed by a processor (not shown).

In operation, the matrix inverting module 602 of the matrix generation system 600 receives an input matrix $[R_x]$. The input matrix $[R_x]$ is the covariance matrix of x (original discrete signals), which can be estimated by using various conventional methods, such as by using DCT models or by computing statistics from a number of sample images. The module 602 then inverts the received matrix $[R_x]$ to output a matrix $[R_x]^{-1}$, which is transmitted to the summing module 614. The matrix inverting module 604 receives an input matrix $[R_n]$. The input matrix $[R_n]$ is the covariance matrix of n (noise), which can be estimated for the specific type and arrangement of components included in the image processing system 100 of FIG. 1. The module 604 then inverts the received matrix $[R_n]$ to output a matrix $[R_n]^{-1}$, which is transmitted to the multiplication modules 610 and 612. The matrix transposing module 608 receives an input matrix [S]. The matrix transposing module then transposes the received matrix [S] to output a matrix $[S]^t$, which is also transmitted to the multiplication modules 510 and 512.

The multiplication module 610 receives the two output matrices $[S]^t$ and $[R_n]^{-1}$ from the matrix transposing module 608 and the matrix inverting module 604, respectively, and the input sampling matrix [S]. The multiplication module 610 then multiplies the three received matrices in the order illustrated in FIG. 6 to derive a matrix $[S]^t[R_n]^{-1}[S]$, which is transmitted to the summing module 614. The summing module receives the matrix $[S]^t[R_n]^{-1}[S]$ from the multiplication module 610 and the matrix $[R_x]^{-1}$ from the matrix inverting module 602. The summing module then adds the two received matrices to output a matrix $[R_x]^{-1}+[S]^t[R_n]^{-1}[S]$, which is transmitted to the matrix inverting module 606. The matrix $[R_x]^{-1}+[S]^t[R_n][S]$ is equivalent to the matrix [Q], as defined in expression (41). Therefore, the matrix $[R_x]^{-1}+[S]^t[R_n][S]$ will now be referred as the matrix [Q]. The module 606 inverts the received matrix [Q] and output a matrix $[Q]^{-1}$, which is transmitted to the multiplication module 612. The module 612 receives the matrix $[Q]^{-1}$ from the matrix inverting module 606, the matrix $[S]^t$ from the matrix transposing module 608, and the matrix $[R_n]^{-1}$ from the matrix inverting module 604. The multiplication module 612 then multiplies the three received matrices in the order illustrated in FIG. 6 to generate the compression-considered demosaicing matrix 206, as defined by expression (48).

Figure 7:
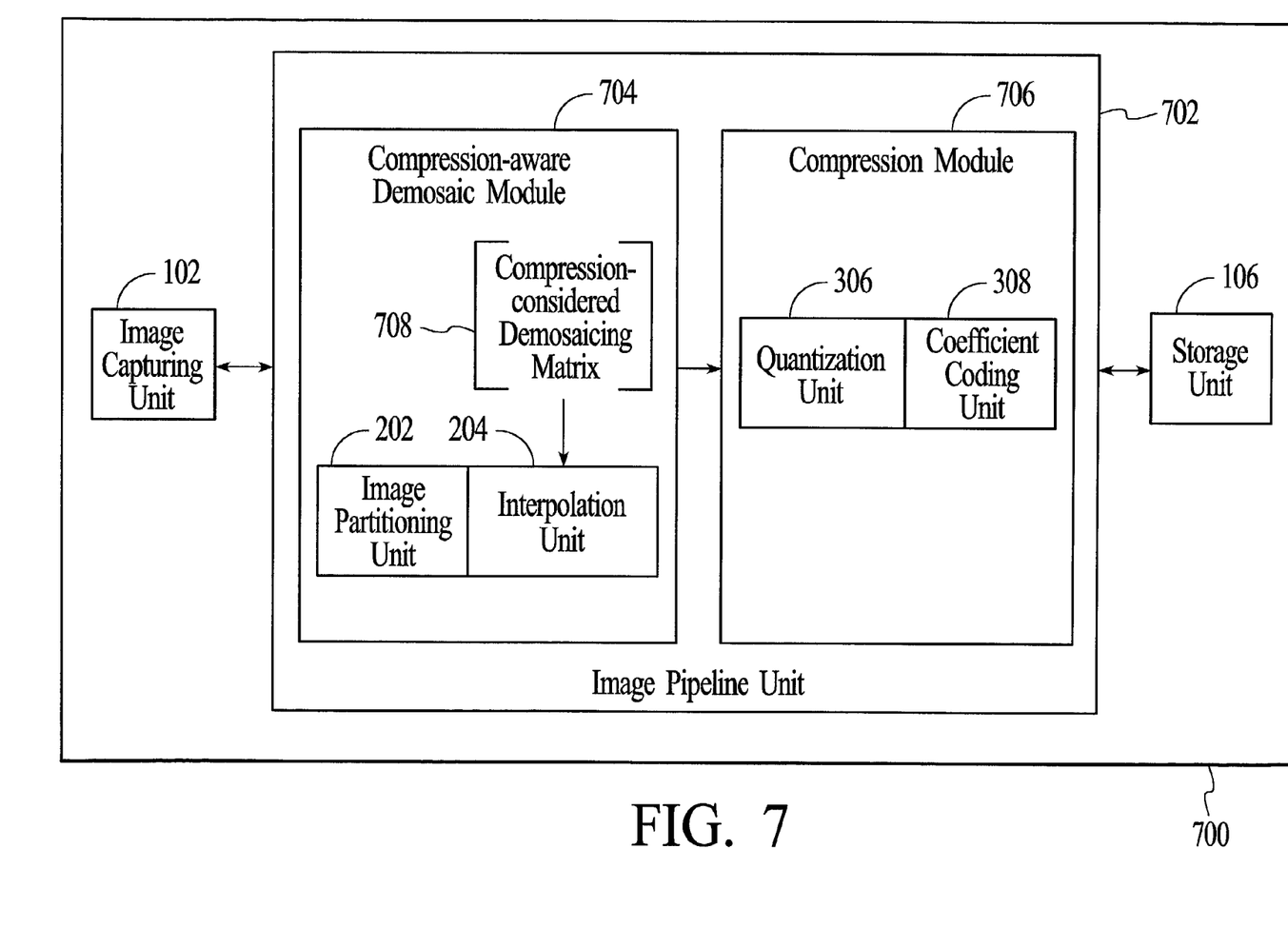
FIG. 7 is a block diagram of an image processing system in accordance with an alternative embodiment of the invention.

With reference to FIG. 7, an image processing system 700 in accordance with an alternative embodiment is shown. The image processing system 700 includes a number of components found in the image processing system 100, which are shown in FIGS. 1, 2 and 3. These common components are indicated in FIG. 7 by the same reference numerals. The image processing system 700 of FIG. 7 includes the image capturing unit 102, an image pipeline unit 702 and the storage unit 106. The image pipeline unit 702 includes a compression-aware demosaic module 704 and a compression module 706. Similar to the compression-aware demosaic module 108 of the system 100 of FIG. 1, the compression-aware demosaic module 704 includes the image partitioning unit 202 and the interpolation unit 204. However, the compression-aware demosaic module 704 utilizes a different compression-considered demosaicing matrix 708. Using the compression-considered demosaicing matrix 708, the compression-aware demosaic module 706 outputs a set of DCT coefficients for each image block processed by the interpolation unit 204. In effect, the interpolation unit 204 performs DCT transformation, as well as demosaicing. Thus, the compression module 706 needs only to perform quantization and coding to complete the compression process. Consequently, the compression module includes only the quantization unit 306 and the coefficient coding unit 308.

The compression-aware demosaic module 704 can perform either the DCT band-limited interpolation method or the DCT Bayesian approach method, depending on the compression-considered demosaicing matrix 708. For the DCT band-limited interpolation method, the compression-considered demosaicing matrix 708 is derived by multiplying the compression-considered demosaicing matrix 206, as defined in expression (15), with the DCT transformation matrix [T]. The compression-considered demosaicing matrix 708 is thus given by:

$$[T][[S][C_{y2r}][T]^t]^{-1}. \qquad (49)$$

For the DCT Bayesian approach method, the compression-considered demosaicing matrix 708 is derived by multiplying the compression-considered demosaicing matrix 206, as defined in expression (48), with the DCT transformation matrix [T]. The compression-considered demosaicing matrix 708 is thus given by:

$$[T][Q]^{-1}[S]^t[R_n]^{-1}. \qquad (50)$$

The compression-considered demosaicing matrix 708 in accordance with the DCT band-limited interpolation method, as defined by expression (49), can be generated by a modified version of the matrix generation system 500 of FIG. 5. The modified matrix generation system includes a second multiplication module (not shown) connected to the output of the matrix inverting module 506. Thus, the second multiplication module receives the output from the matrix inverting module 506. In addition, the second multiplication module receives an input matrix [T], which is multiplied to the output of the matrix inverting module 506. The output of the second multiplication module is the compression-considered demosaicing matrix 708, as defined by expression (49).

The compression-considered demosaicing matrix 708 in accordance with the DCT Bayesian approach method, as defined by expression (50), can be generated by a modified version of the matrix generation system 600 of FIG. 6. The modified matrix generation system is configured to receive an input matrix [T] at the multiplication module 612, in addition to the outputs from the matrix inverting modules 604 and 606, and from the matrix transposing module 608. The multiplication module 612 thus multiplies the matrices [T], [Q]$^{-1}$, [R$_n$]$^{-1}$, and [S]$^t$ to generate the compression-considered demosaicing matrix 708, as defined by expression (50).

Figure 8:
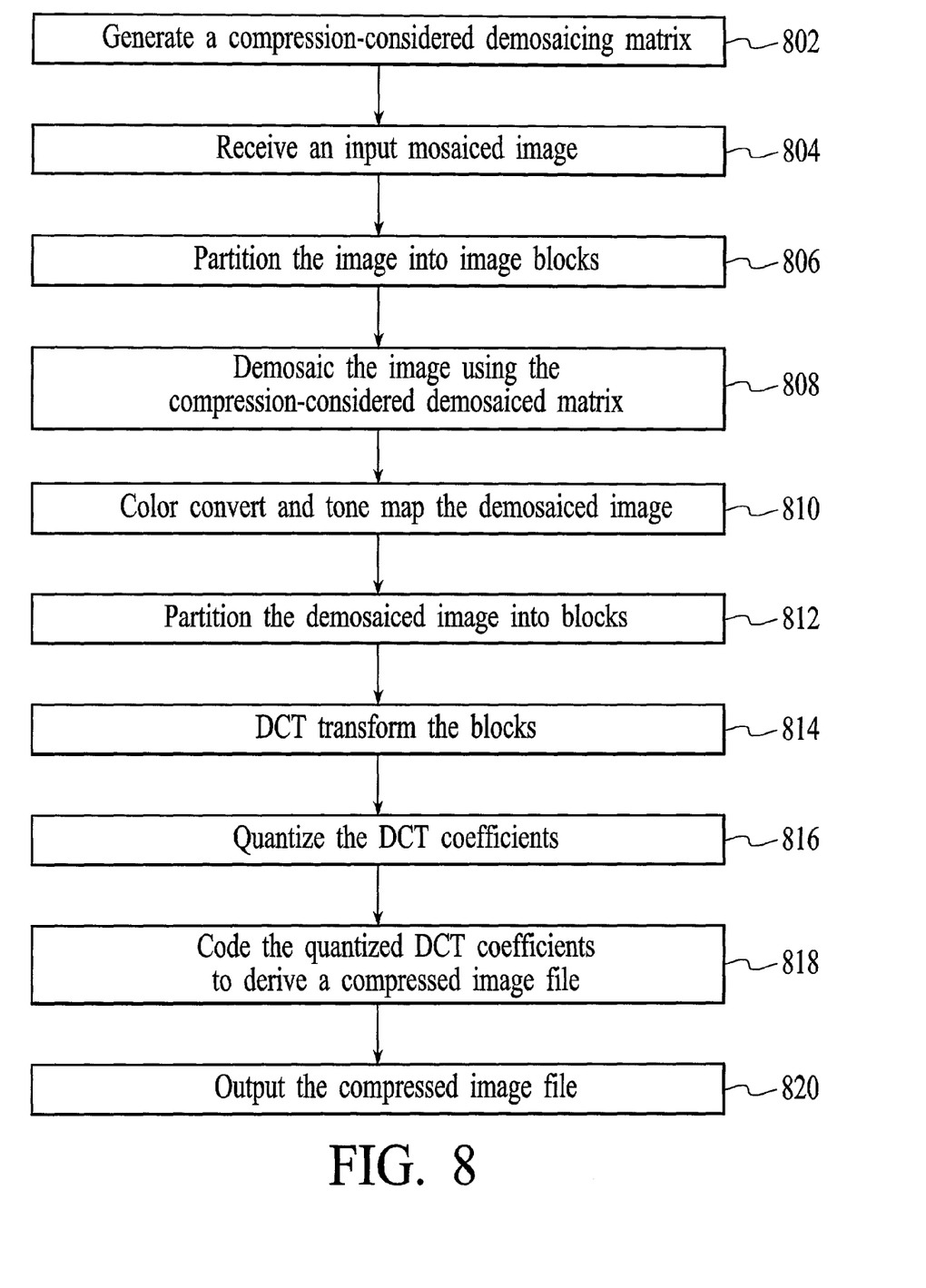
FIG. 8 is a process flow diagram of a method of processing a mosaiced image in accordance with the present invention.

A method of processing a mosaiced image in accordance with the present invention is described with reference to FIG. 8. At step 802, a compression-considered demosaicing matrix is generated according to the DCT band-limited interpolation method or the DCT Bayesian approach method. At step 804, an input mosaiced image is received. Next, at step 806, the input mosaiced image is partitioned into image blocks. As an example, the input image may be partitioned into 16×16 pixel image blocks. At step 808, the input image is demosaiced using the compression-considered demosaicing matrix. Next, at step 810, the demosaiced image is color and tone enhanced. Step 810 is an optional step, and thus, may be omitted from the method.

At step 812, the demosaiced image is partitioned into blocks for compression. The blocks are then DCT transformed, at step 814. As a result, DCT coefficients of the image are derived. Next, at step 816, the DCT coefficients are quantized. The quantized coefficients are then coded using, for example, Huffman tables or arithmetic coding, to derive a compressed image file, at step 818. Next, at step 820, the compressed image file is outputted.

In an alternative embodiment, steps 810, 812 and 814 are omitted from the method. In this embodiment, the DCT coefficients are generated by the demosaicing operation at step 808. Thus, in this alternative embodiment, steps 808 and 812 are combined into a single step of demosaicing the input mosaiced image using the compression-considered demosaicing matrix to derive the DCT coefficients.

The above-described demosaicing methods and the corresponding demosaicing matrices can be modified to be applicable to wavelet-based compression schemes, such as the JPEG 2000. For a wavelet-based compression scheme, the transformation matrix, as defined in equation (5), is replaced with a wavelet transformation matrix. The formulation and solution of the reconstruction problem will be the same. The resulting demosaicing matrix can then be used to demosaic input mosaiced images, prior to being compressed using the wavelet-based compression scheme. Consequently, the only significant modification needed to convert the image processing systems 100 and 700 to an image processing system that utilizes a wavelet-based compression scheme is the replacement of either the compression module 112 or the compression module 706 with a comparable compression module that performs compression based on wavelets.

What is claimed is:

1. A method of demosaicing a mosaiced image comprising:
    receiving said mosaiced image, said mosaiced image being a representation of a scene of interest; and
    processing said mosaiced image using a demosaicing operator on blocks of said mosaiced image to derive a representation of a demosaiced image, including interpolating said mosaiced image using said demosaicing operator, said demosaicing operator incorporating a frequency-based transformation operator to take into account a subsequent frequency-based compression process, and demosaicing operator being derived by defining selected coefficients of transformation-related coefficients as being equal to zero, said selected coefficients being higher frequency components than remaining coefficients of said transformation related coefficient.

2. The method of claim 1 wherein said demosaicing operator used in said processing of said mosaiced image includes a color space conversion operator for converting from an original color space to a different color space.

3. The method of claim 2 wherein said demosaicing operator used in said processing of said mosaiced image includes said color space conversion operator for converting from an RGB color space to a Yc$_r$c$_b$ color space.

4. The method of claim 1 wherein said processing of said mosaiced image includes interpolating said mosaiced image using said demosaicing operator, said demosaicing operator being derived by defining transformation-related coefficients as having a predefined probability distribution.

5. The method of claim 4 wherein said demosaicing operator is derived using the Bayesian rule.

6. The method of claim 4 wherein said predefined probability distribution is a Normal distribution.

7. The method of claim 1 wherein said frequency-based a transformation operator is a DCT-based transformation operator.

8. The method of claim 1 wherein said frequency-based transformation operator is a wavelet-based transformation operator.

9. The method of claim 1 wherein said representation of said demosaiced image includes one of (a) a plurality of image pixel values, and (b) a plurality of transformed coefficients.

10. The method of claim 1 wherein said demosaicing operator and said frequency-based transformation operator are matrices.

11. A method of processing a mosaiced image comprising:
    receiving said mosaiced image, said mosaiced image being a representation of a scene of interest;
    demosaicing said mosaiced image using a demosaicing operator to produce a representation of a demosaiced image, said demosaicing operator incorporating a frequency-based transformation operator; and compressing said representation of said demosaiced image using a frequency-based compression scheme; and
    generating said demosaicing operator, including defining transformation-related coefficients that are associated with said compressing of said demosaiced image, said defining of said transformation-related coefficients including defining selected coefficients of said transformation-related coefficients as being equal to zero, said selected coefficients being higher frequency components than remaining coefficients of said transformation related coefficient.

12. The method of claim 11 wherein said demosaicing operator used in said demosaicing of said mosaiced image includes a color space conversion operator for converting from an original color space to a different color space.

13. The method of claim 12 wherein said demosaicing operator used in said demosaicing of said mosaiced image includes said color space conversion operator for converting from an RGB color space to a Yc$_r$c$_b$ color space.

14. The method of claim 11 wherein said defining of said transformation-related coefficients includes defining said transformation-related coefficients as having a predefined probability distribution.

15. The method of claim 14 wherein said generating of said demosaicing operator includes applying the Bayesian rule to derive said demosaicing operator.

16. The method of claim 11 wherein said frequency-based transformation operator is a DCT-based transformation operator, and wherein said frequency-based compression scheme is a DCT-based compression scheme.

17. The method of claim 11 wherein said frequency-based transformation operator is a wavelet-based transformation operator, and wherein said frequency-based compression scheme is a wavelet-based compression scheme.

18. The method of claim 11 wherein said representation of said demosaiced image includes one of (a) a plurality of image pixel values, and (b) a plurality of transformed coefficients.

19. A system for processing a mosaiced image comprising:
 means for demosaicing said mosaiced image to produce a representation of a demosaiced image using a demosaicing operator, said demosaicing operator incorporating a frequency-based transformation operator; and
 means for compressing said representation of said demosaiced image to produce a compressed image file, said compressing means configured to perform a frequency-based compression process,
 wherein said demosaicing operator is derived by defining transformation-related coefficients that are associated with said frequency-based compressing process performed by said compressing means and by defining selected coefficients of said transformation-related coefficients as being equal to zero, said selected coefficients being higher frequency components than remaining coefficients of said transformation related coefficient.

20. The system of claim 19 wherein said demosaicing operator used by said demosaicing means includes a color space conversion operator for converting to a $Yc_r c_b$ color space.

21. The system of claim 19 wherein said demosaicing operator is derived by defining said transformation-related coefficients as having a predefined probability distribution.

22. The system of claim 19 wherein said demosaicing means and said compressing means are embodied in an application specific integrated circuit.

23. The system of claim 19 wherein said frequency-based transformation operator is a DCT-based transformation operator, and wherein said frequency-based compression process is a DCT-based compression process.

24. The system of claim 19 wherein said frequency-based transformation operator is a wavelet-based transformation operator, and wherein said frequency-based compression process is a wavelet-based compression process.

25. The system of claim 19 wherein said representation of said demosaiced image includes one of (a) a plurality of image pixel values, and (b) a plurality of transformed coefficients.

26. The method of claim 19 wherein said demosaicing operator and said frequency-based transformation operator are matrices.

27. A method of demosaicing a mosaiced image comprising:
 receiving said mosaiced image, said mosaiced image being a representation of a scene of interest; and
 processing said mosaiced image using a demosaicing operator on blocks of said mosaiced image to derive a representation of a demosaiced image, including interpolating said mosaiced image using said demosaicing operator, said demosaicing operator incorporating a frequency-based transformation operator to take into account a subsequent frequency-based compression process, said demosaicing operator being derived by defining transformation-related coefficients as having a predefined probability distribution, said demosaicing operator being derived using the Bayesian rule.

* * * * *

UNITED STATES PATENT AND TRADEMARK OFFICE
CERTIFICATE OF CORRECTION

PATENT NO.         : 7,155,066 B2                                          Page 1 of 1
APPLICATION NO. : 09/871408
DATED              : December 26, 2006
INVENTOR(S)        : Baharav et al.

It is certified that error appears in the above-identified patent and that said Letters Patent is hereby corrected as shown below:

In column 15, line 67, in Claim 1, delete "and" and insert -- said --, therefor.

In column 16, line 24 (Approx.), in Claim 7, after "frequency-based" delete "a".

In column 16, line 43 (Approx.), in Claim 11, after "operator;" delete "and".

In column 17, line 25, in Claim 19, delete "process." and insert -- process, --, therefor.

In column 17, line 28, in Claim 19, delete "compressing" and insert -- compression --, therefor.

Signed and Sealed this

First Day of May, 2007

JON W. DUDAS
*Director of the United States Patent and Trademark Office*